United States Patent
LeGendre et al.

(10) Patent No.: US 8,903,993 B2
(45) Date of Patent: Dec. 2, 2014

(54) PERFORMANCE ANALYSIS USING ANONYMOUS AGGREGATED DATA

(75) Inventors: David B. LeGendre, Tucson, AZ (US); Dash D. Miller, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 13/486,405

(22) Filed: Jun. 1, 2012

(65) Prior Publication Data

US 2013/0326051 A1    Dec. 5, 2013

(51) Int. Cl.
*G06F 15/173* (2006.01)

(52) U.S. Cl.
USPC .......................................... 709/224; 709/223

(58) Field of Classification Search
USPC .......... 709/200, 201, 202, 203, 220, 223, 250
See application file for complete search history.

(56) References Cited

U.S. PATENT DOCUMENTS

| | | | |
|---|---|---|---|
| 5,740,490 A * | 4/1998 | Yamashita et al. ................. 399/8 |
| 6,944,759 B1 | 9/2005 | Crisan | |
| 7,849,186 B2 * | 12/2010 | Satt et al. ...................... 709/224 |
| 8,055,739 B2 | 11/2011 | Branca et al. | |
| 8,285,836 B2 * | 10/2012 | Haga et al. .................... 709/224 |
| 8,627,509 B2 * | 1/2014 | Washingon et al. ............ 726/32 |
| 2005/0289401 A1 * | 12/2005 | Goin et al. ...................... 714/47 |
| 2007/0124112 A1 * | 5/2007 | Weyermann .................. 702/182 |
| 2007/0219646 A1 * | 9/2007 | Oslake et al. .................... 700/32 |
| 2007/0266080 A1 * | 11/2007 | McNicol et al. ............... 709/203 |
| 2008/0168774 A1 * | 7/2008 | Drnevich et al. ................. 60/777 |
| 2008/0228755 A1 * | 9/2008 | Haga et al. ........................ 707/5 |
| 2009/0013414 A1 * | 1/2009 | Washington et al. ........... 726/32 |
| 2009/0222551 A1 * | 9/2009 | Neely et al. .................... 709/224 |
| 2010/0082407 A1 * | 4/2010 | Akkiraju et al. ................ 705/10 |
| 2010/0228857 A1 * | 9/2010 | Petrovic et al. ............... 709/224 |
| 2010/0318986 A1 * | 12/2010 | Burke et al. ................... 717/176 |
| 2011/0009991 A1 * | 1/2011 | Dinicola et al. ................ 700/97 |
| 2011/0022501 A1 | 1/2011 | Iguchi | |
| 2011/0047269 A1 * | 2/2011 | Satt et al. ....................... 709/224 |
| 2011/0231536 A1 * | 9/2011 | Tanaka et al. ................. 709/223 |
| 2012/0053896 A1 | 3/2012 | Mach | |
| 2012/0253020 A1 * | 10/2012 | Durden ..................... 530/389.1 |

FOREIGN PATENT DOCUMENTS

DE    102005037239 A1    2/2007

OTHER PUBLICATIONS

"Performance Tuning Best Practices for ESX Server 3", vmware, VMware ESX Server, pp. 1-22, 1998-2006.

* cited by examiner

*Primary Examiner* — Sargon Nano
(74) *Attorney, Agent, or Firm* — Kunzler Law Group

(57) ABSTRACT

An approach to improving performance of a target system is disclosed. The approach may involve determining how similar a target system being considered is to other systems in use by other clients. For each of these other separate systems, the approach may involve determining the differences between the performance of the target system and the performance of the separate system, accounting for the level of similarity. A report can be generated that identifies performance values of the target system that are outside an acceptable range, which is based on the performance of the other separate systems. Based on this report, the administrator of the target system can consider configuration changes and upgrades to improve performance of the target system.

20 Claims, 5 Drawing Sheets

PERFORMANCE ANALYSIS USING ANONYMOUS AGGREGATED DATA

FIELD

The subject matter disclosed herein relates to analyzing the performance of a target system using anonymous, aggregated data from other systems that are separate from the target system being analyzed.

BACKGROUND

As computing systems grow increasingly versatile and customizable, in terms of both hardware and software, it can become very difficult to tune the computing system to improve performance. In complicated computing systems, with so many options, it can take years of experience to develop the intuition necessary to identify problems and configuration options to address those problems.

For example, in a z/OS environment for a mainframe computer, an administrator may need to identify and address a bottleneck. The administrator may look at Resource Measurement Facility (RMF) data to narrow down where the bottleneck exists. The administrator may look at RMF data to evaluate cache structure performance or other aspects of sysplex-level input/output (I/O) performance. The RMF data may relate to the physical hardware, the I/O speed, and the cache hit/miss statistics. An experienced administrator may use the hit/miss statistics to determine that a particular cache structure is improperly tuned, or overloaded. That administrator may then need to consider adjusting the timing of running jobs, cache assignments, and the possible impact of adding hardware to the system to address the problem. Even an experienced administrator would have a difficult time predicting the effects of such changes in the computing system.

As seen from the example above, while the RMF data is available to be analyzed, it may take years of experience with z/OS computing systems before the administrator learns what to look for in the RMF data to identify the bottleneck and its location, or to differentiate good performance values from bad performance values. Even after changes are made, the administrator is saddled with the task of monitoring how the changes affect performance, and whether those changes are having unintended consequences elsewhere in the system. Even in computing systems other than z/OS systems, from storage area networks (SANs) to desktop computers, the multiplicity of options makes tuning difficult.

A solution is needed to solve the problems of identifying performance issues in a computing system, and identifying possible solutions to ameliorate those problems. A further benefit would be the ability to provide an upgrade path and to predict, based on actual performance data, how the upgrade will affect performance.

BRIEF SUMMARY

An approach to improved performance analysis is disclosed. The summary that follows is for convenience, and is not a limitation on the claims.

The invention may be realized as a computer program product stored on a computer readable storage medium. The computer program product may comprise various instructions, including instructions for determining the level of similarity between a target system and a plurality of separate systems. The computer program product may further determine differences between the target performance values of the target system and the reference performance values of one or more of the separate systems. The computer program product may account for the level of similarity, and report target performance values that are outside an acceptable range.

The invention may be realized as a system that includes a server communicatively connected to a target system and to a plurality of separate systems by a network. A repository apparatus may maintain a repository of reference configurations of the separate systems, and reference performance values of the separate systems. The repository apparatus may associate the reference performance values with the corresponding reference configuration of the separate system that generated the reference performance values.

The system may also include an analysis apparatus that determines a level of similarity between a target system and one or more of the separate systems using a target configuration and the reference configurations. The analysis apparatus may determine the differences between the target performance values of the target system and the reference performance values, and account for the level of similarity between the target system and the separate systems. The analysis apparatus may further generate a report if one or more of the differences, after accounting for the level of similarity, fall outside an acceptable range.

The invention may be realized as a computer-implemented method that includes comparing a target configuration of the target system with reference configurations for separate systems in order to determine a level of similarity between the target system and the separate systems. The method may also involve determining the differences between the target performance values of the target system and the reference performance values of the separate systems, accounting for the level of similarity. The method may also involve generating a report comprising one or more of the differences that are outside the acceptable range.

In one embodiment, the invention is a computer program product stored on a computer-readable storage medium with instructions for comparing a target configuration of the target system with a reference configuration of a separate system, and for creating a match percentage that represents a percentage match between the target configuration and the reference configuration. The instructions may further be for creating a comparison threshold by subtracting the match percentage from one-hundred.

The computer program product may, for each data value of the target performance values of the target system, determine a performance percentage difference that is a difference between the target performance value and a corresponding reference performance value of the separate system expressed as a percentage. The computer program product may also create a performance threshold for each data value of the target performance values by subtracting the performance percentage difference from one-hundred.

The computer program product may, for each data value of the target performance values being analyzed, compare the comparison threshold and the performance threshold and report each data value of the target performance values for which the performance threshold is greater than the comparison threshold.

The present invention may be realized in a variety of forms. The present invention may be realized as a computer program product, a system, a method, or other form. References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
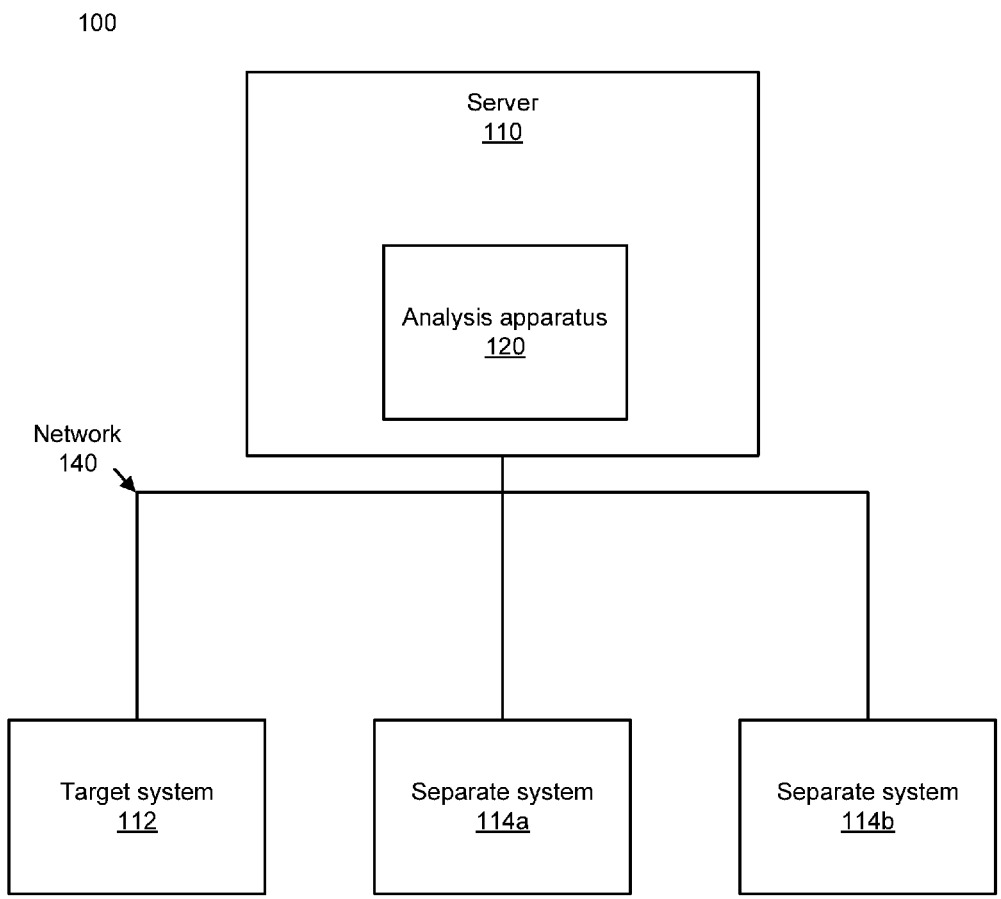
FIG. 1 is an illustrative block diagram showing one embodiment of a system comprising a server, a target system, and separate systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in micro-code, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. The computer readable medium may be non-transitory.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 including a server 110 that includes an analysis apparatus 120, a target system 112, and separate systems 114a and 114b communicatively connected to the server 110 by a network 140.

The server 110 is one or more physical computing devices that provide one or more services to the target system 112 and the separate systems 114. The server 110 connects to the target system 112 and the separate systems 114a-b via a network 140 that allows for communications between the server 110 and the systems 112 and 114a-b. The network 140 may be a wide area network (WAN) such as the Internet, and implement any of a variety of network protocols such as, for example, the Internet protocol suite. The server 110 may implement an encrypted cloud. The cloud may include other devices in addition to the server 110.

The target system 112 is a computing system comprising hardware and software that is the subject of analysis by the analysis apparatus 120, discussed below. The target system 112 may be a laptop computer, a desktop computer, a storage area network (SAN), a mainframe computer implementing an operating system such as z/OS, a cluster computer, or variety suitable computing system.

The separate systems 114a-b are computing systems comprising hardware and software that provide the analysis apparatus 120 with reference configuration data and reference performance values that can be used to analyze the target system 112. The term "separate" is used to emphasize that the target system 112 and the separate system 114a are physically and logically separate computing systems. Thus, for example, the target system 112 may be a first z/OS system running on a first mainframe computer for a first client, while the separate system 114a is a second z/OS system running on a second mainframe computer for a second client. While FIG. 1 shows only two separate systems 114a and 114b, the system 100 may include N-number of separate systems 114.

The designations target system 112 and separate system 114 are relative terms that designate which computing system is being analyzed; for example, the user of the separate system 114a may desire to have the separate system 114a analyzed using data collected from the target system 112 and the separate system 114b. In this situation, the separate system 114a being analyzed may be considered the target system, and the target system 112 that provides data used in the analysis may be considered a separate system. Thus, the system 100 need not have a particular, fixed target system 112 or fixed separate systems 112.

The analysis apparatus 120 compares the configuration and the performance of the target system 112 with the configuration and performance of the separate systems 114a-b. The analysis apparatus 120 may identify performance values that indicate areas where the tuning of the target system 112 can be adjusted to improve performance; similarly, the analysis may identify performance values that indicate areas where the target system 112 is outperforming separate systems 114a-b. The analysis apparatus 120 may also weight the comparisons of the performance values based on the level of similarity between the target systems 112 and the separate systems 114a-b; for example, if target system 112 and separate system 114a are identically configured, then a 10% performance difference may be considered significant and reported to an administrator. The performance difference between the target system 112 and the separate system 114b may also be 10%; however, if the target system 112 and the separate system 114b are very different in terms of configuration, the 10% performance difference may not be considered significant after accounting for the level of similarity.

The term configuration refers to the hardware and/or software arrangement for a system such as the target system 112 or the separate systems 114a-b. As an example, the target system 112 may be a mainframe computer implementing a z/OS operating system, and the separate systems 114a and 114b may also be mainframe computers implementing z/OS operating systems. The configuration of the target system 112 may include information such as the model numbers of equipment and the number of logical partitions (LPARs). Other configuration data may also be used.

The analysis apparatus 120 may collect the target configuration and compare it against the configurations of the separate systems 114a and 114b. The analysis apparatus 120 may then compare performance values for the target system 112 (target performance values) with performance values of the separate systems 114a and 114b (reference performance values). Performance values refer to values that indicate how one or more aspects of the system are performing. The performance values may be, for example, RMF values gathered for the target system 112 and the separate systems 114a-b and sent to the server 110. Based on the differences between the RMF values, and the level of similarity between the target system 112 and the separate systems 114a-b, the analysis apparatus 120 may determine significant differences in the performance of the target system 112 and alert the administrator of the target system 112 of these differences. The administrator may use this report to make tuning and optimization decisions for the target system 112.

Figure 2:
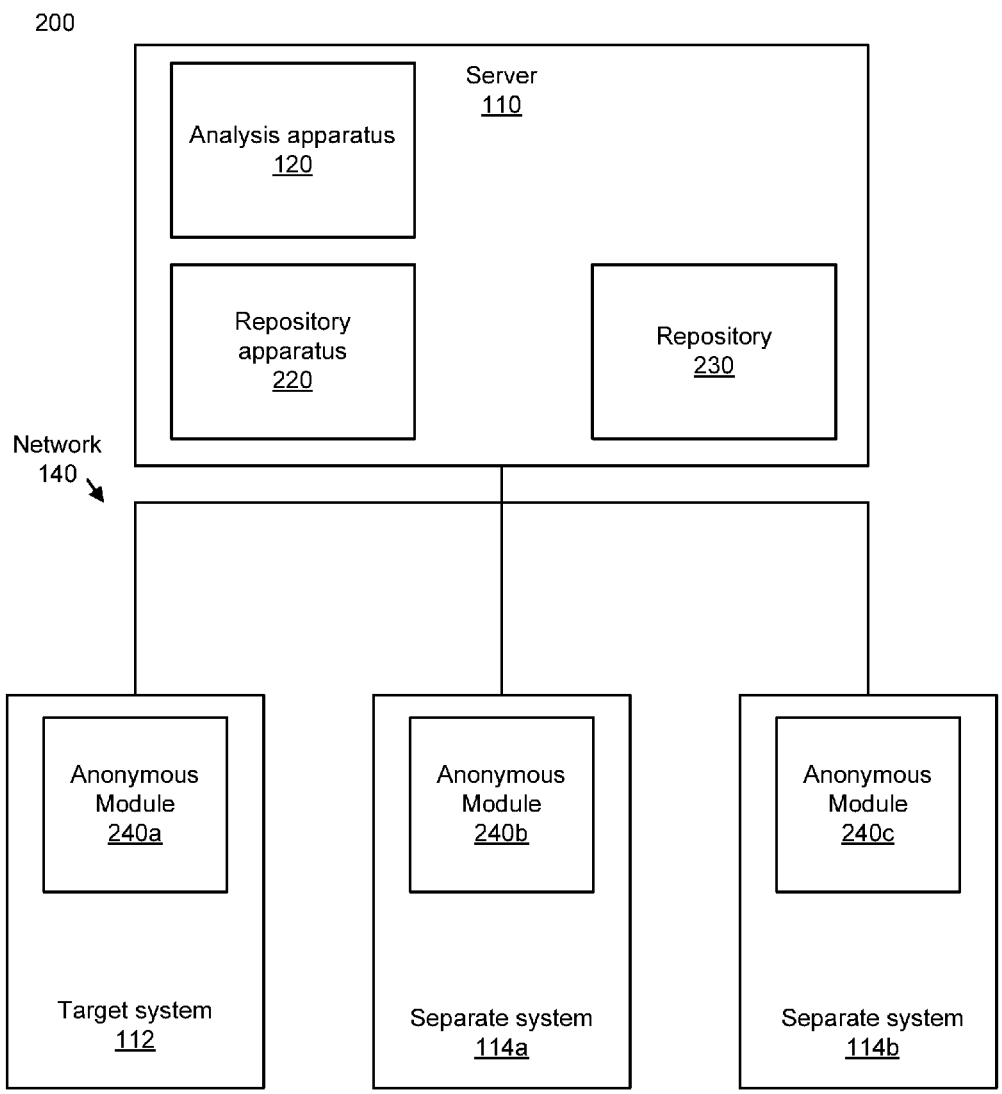
FIG. 2 is an illustrative block diagram showing one embodiment where the server includes an analysis apparatus and a repository apparatus, and the systems include anonymous modules.

FIG. 2 shows an embodiment of a system 200 comprising a server 110, target system 112, and separate systems 114a-b. In FIG. 2, the server 110 includes the analysis apparatus 120, a repository apparatus 220, and a repository 230. The target system 112 and the separate systems 114a and 114b may include anonymous modules 240a-c respectively.

In one embodiment, the analysis apparatus 120 determines a level of similarity between the target system 112 and the separate systems 114a-b. The analysis apparatus 120 may determine the level of similarity by comparing the target configuration of the target system 112 with the reference configurations of the separate systems 114a-b.

The analysis apparatus 120 may also determine differences between the target performance values of the target system 112 and the reference performance values of the separate systems 114a-b. The analysis apparatus 120 may do so for each separate system 114a-b in the system 200; in other embodiments, the analysis apparatus 120 may only consider the differences for those separate systems 114a-b that have a threshold level of similarity with the target system 112. In such embodiments, separate systems 114a-b that are too dissimilar in configuration from the target system 112 may not be considered.

The analysis apparatus 120 may also account for the level of similarity between the target system 112 and the separate systems 114a-b. For example, as noted above, relatively small differences between performance values for the target system 112 and performance values for the separate system 114a may be given greater weight than larger differences in performance values between the target system 112 and the separate system 114b, if the separate system 114a has a higher level of similarity with the target system 112 than the separate system 114b.

The analysis apparatus 120 may also generate a report in response to one or more of the differences in performance values being outside an acceptable range once the level of similarity is accounted for. The report may indicate superior performance where the target performance values are above the acceptable range. The report may also indicate inferior performance where the target performance values are below the acceptable range. The report may further include recommendations for addressing inferior performance. The report may include configuration data describing the configuration of a separate system 114a that has superior performance than the target system 112 for one or more performance values. In certain embodiments, an administrator may use the report to tune and optimize the target configuration of the target system 112. As a result, the amount of guesswork in tuning the target system 112 is reduced, and an administrator can be guided by actual performance of other separate systems 114a-b in making decisions about how to configure the target system 112.

The target system 112 and the separate systems 114a-b may be equipped with anonymous modules 240a-c. The anonymous modules 240a-c may be responsible for gathering configuration data and performance values from the target system 112 and the separate systems 114a-b and uploading the configuration data and performance data to the server 110. The anonymous module 240a-c may gather the configuration data and the performance data at intervals set by default, or at intervals set by a user. The anonymous module 240a-c may push the configuration and performance data to the server 110, or the server 110 may pull the configuration and performance data. Various approaches may be implemented to gather configuration data and performance data in the system 200.

In certain embodiments, the anonymous module 240a-c also removes client-identifying information from the configuration and performance values for the target system 112 and the separate systems 114a-b. The anonymous module 240a-c may remove the client-identifying information before transmitting the configuration and performance values over the network 140. In other embodiments, the anonymous module 240a-c is implemented on the server 110 and removes client-identifying information after the configuration data and performance data have been transmitted to the server 110 over the network 110.

The server 110 may further include the repository apparatus 220. The repository apparatus 220 may maintain a repository 230 of performance values and configurations for the target system 112 and the separate systems 114a-b. The repository 230 is one or more devices for data storage. The repository 230 may be, for example, one or more hard disk drives. Other devices that can store data and act as a repository 230 may also be used. The repository 230 may also include software for organizing the data from the target system 112 and the separate systems 114a-b. For example, the repository 230 may include one or more databases for storing and organizing the data.

The repository apparatus 220 may be responsible for gathering reference configurations for the separate systems 114a-b. The repository apparatus 220 may poll the separate systems 114a-b for the reference configurations. The separate systems 114a-b may push the reference configurations to the repository apparatus 220.

The repository apparatus 220 may also be responsible for gathering reference performance values from the separate systems 114a-b. As above, the repository apparatus 220 may pull the reference performance values, or have the reference performance values pushed to it. In certain embodiments, the separate systems 114a-b gather reference performance values for the respective separate systems 114a-b at regular intervals, which reference performance values are received by, and stored by, the repository apparatus 220.

The repository apparatus 220 may associate the reference performance values received from the separate system 114a-b with the corresponding reference configuration for the separate system 114a-b that generated the reference performance values. In this manner, the repository apparatus 220 may build a repository 230 containing data that allows analysis of how a particular configuration of a system affects performance of the system.

The repository apparatus 220 may also gather a target configuration for the target system 112 and target performance values for the target system 112 and store that data in the repository 230. The examples of approaches given above in connection with the separate systems 114a-b may also be used to gather the target configuration and the target performance values from the target system 112.

The repository apparatus 220 may also be configured to store data in the repository 230 relating to how changes in configuration affect performance of systems. The repository apparatus 220 may determine that one of the reference configurations for a separate system 114a-b has changed. The repository apparatus 220 may receive a reference configuration for the separate system 114a and compare it with a previous reference configuration for the separate system 114a and determine that a change has occurred. In another embodiment, the separate system 114a may push an updated reference configuration to the repository apparatus 220 in response to a change in the reference configuration for the separate system 114a. The separate system 114a may flag the updated reference configuration to alert the repository apparatus 220 of the change in the updated reference configuration. Other approaches by which the repository apparatus 220 may determine that a change in the reference configuration data has occurred may also be used.

The repository apparatus 220 may, in response to the change in the reference configuration for the separate system 114a, associate the updated reference configuration and the previous reference configuration. The repository apparatus 220 may, for example, ensure that entries for both the previous reference configuration and the updated reference configuration have the same clientID. The repository apparatus 220 may then associate any future reference performance values for the separate system 114a generated using the updated reference configuration with the updated reference configuration, as opposed to the previous reference configuration.

The analysis apparatus 120 may be configured to compare the reference performance values for the separate system 114a generated with the previous reference configuration and the performance values for the separate system 114a with the updated reference configuration in order to determine how the change in configuration affected performance values. For example, the analysis apparatus 120 may determine that the change in the reference configuration resulted in a 10% increase in bandwidth for the separate system 114a. The analysis apparatus 120 may use this information to provide update options and upgrade information to a user of a target system 112 seeking to solve a particular problem, or seeking to upgrade the configuration of the target system 112.

The analysis apparatus 120 may be configured to generate an upgrade report that comprises differences between the reference performance values for a separate system 114a under a previous reference configuration and the reference performance values for the separate system 114a under the upgraded reference configuration. In certain embodiments, the analysis apparatus 120 selects separate systems 114a having a previous reference configuration that is similar to that of the target configuration of the target system 112. The analysis apparatus 120 may provide an upgrade report that outlines changes in the performance values of the separate system 114a after the change in its configuration, which may provide the administrator with insight in how a comparable change in configuration for the target system 112 would affect performance of the target system 112.

In other embodiments, the analysis apparatus 120 may predict the impact of a particular change in configuration based on the effects of that particular change across a plurality of separate systems 114a-b. For example, the analysis apparatus 120 may consider the impact adding a particular I/O device has on I/O performance. The analysis apparatus 120 may find separate systems 114a-b that added that particular I/O device and determine the change in I/O performance after the particular I/O device was added on those separate systems 114a-b. Based upon this sample, the analysis apparatus 120 may estimate an expected change in I/O performance should that I/O device be added to the target system 112.

The analysis apparatus 120 may receive a request from the administrator of the target system 112 to estimate the impact of making a certain change in configuration on the target system 112. The analysis apparatus 120 may respond with an upgrade report as explained above. The analysis apparatus 120 may be configured to receive requests from an administrator of the target system 112 seeking information on how to alter the performance of the target system 112. For example, the administrator may indicate that she wants I/O performance to fall within a certain range. The analysis apparatus 120 may be configured to provide an upgrade report that indicates how the configuration of the target system 112 can be changed to provide the requested performance by considering the changes in the reference configurations of the separate systems 114a-b that caused such a change.

While the present application uses the term "upgrade," that term is used broadly to refer to any changes in configuration, regardless of its actual or expected impact on performance. For example, the term may refer to removing components from a system, which may be expected to lower performance, in addition to referring to adding components to the system in order to improve performance. Similarly, the term "report" is used broadly to encompass a variety of forms of communication including, but not limited to, email, displays on a graphical user interface (GUI), printouts, and others.

Figure 3A:
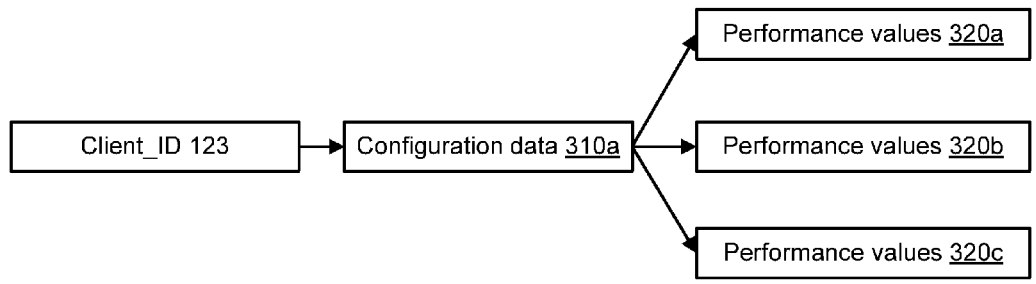
FIGS. 3A and 3B are illustrative block diagrams showing one embodiment of configuration data, performance values, and performance changes that may be stored in a data repository.

FIG. 3A shows one embodiment of how reference configuration data and reference performance values may be stored in a repository 230. The configuration data is relevant data that describes the configuration of a system. In FIG. 3A, a particular separate system 114 may be assigned a client_ID 123. In one embodiment, the client_ID uniquely identifies the separate system 114 from other separate systems 114, but does not identify the actual client for the separate system 114. The client_ID may be, for example, a random alphanumeric code. This client_ID may be uniquely associated with the separate system 114, but need not identify, for example, the name of the client implementing the separate system 114.

The repository 230 may also include reference configuration data 310a for the separate system 114. The reference configuration data 310a may include: the number of LPARS; the model numbers of equipment in the separate system 114; the direct access storage device (DASD) configuration; tape configuration; storage capacity; channels; extenders; coupling facility resources; virtualization setup; operating system (OS) levels; maintenance levels; original equipment manufacturer (OEM) products in place; components and products in use; default configurations; and others. The configuration data 310a may be stored in a first database that is configured for storing configuration data of separate systems 114.

The repository 230 may also include performance values 320a-c. The performance values 320a-c may be stored in a second database. The configuration data 310a may have a one-to-many relationship with the performance values 320a-c. The repository apparatus 220 may receive performance values 320a-c at intervals from the separate system 114 that has the client_ID 123. As the performance values 320a-c are received, the repository apparatus 220 may create new entries in the second database for those performance values 320a-c. In certain embodiments, the repository apparatus 220 may consolidate certain entries of performance values 320b; for example, the repository apparatus 220 may take three sets of entries of performance values 320a-c, determine averages for the performance values 320a-c, and consolidate them into a single entry of average performance values 320a-c.

Figure 3B:
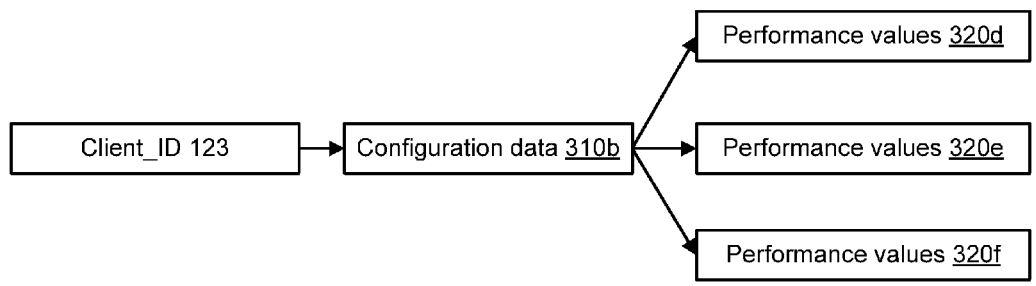

FIG. 3B illustrates one embodiment of how data may be stored in the repository 230 in response to a change in the configuration data 310a. In FIG. 3B, the separate system 114 associated with client_ID 123 may have its configuration changed. Hardware or software may be added or removed, settings for hardware or software may be altered, or other configuration changes may have occurred. In response, the repository apparatus 220 may create a new entry comprising configuration data 310b representing the changes in the configuration. The repository apparatus 220 may associate the configuration data 310b with the same client_ID 123 since the client remains the same.

The repository apparatus 230 may further receive performance values 320d, which performance values 320d were generated on the separate system 114 with the updated configuration data 310b, as opposed to the previous configuration data 310a. These performance values 320d may be associated with the configuration data 310b, as opposed to the configuration data 310a. As further performance values 320e and 320f are generated by the separate system 114, these performance values 320e and 320f may also be received by the repository apparatus 230 and associated with the configuration data 310b.

The analysis apparatus 120 may continue to use the configuration data 310a and the performance values 320a-c in analyzing the performance of target systems 112; for example, if the target system 112 has a target configuration that is similar to the configuration data 310a, the reference performance values 320b may be compared against the target performance values as described above to determine whether one or more target performance values are outside of an acceptable range. The analysis apparatus 120 may further use the configuration data 310b and the reference performance values 320d-f to make such determinations.

The repository apparatus 320 may also store performance changes 340a-c that is data representing changes in performance for the system after the change in configuration. The performance changes 340a-c may be stored in a third database. With the performance values 320a-c for the previous configuration data 310a for the separate system 114, and the performance values 320d-f for the updated configuration data 310b, the repository apparatus 320 may determine how the performance values 320a-c and the performance values 320d-f change after the change in the configuration for the separate system 114. The repository apparatus 320 may determine the differences between the performance values 320a-c and the performance values 320d-f, quantify the differences, and store a representation of the differences as performance changes data 340a-c. Such information may provide useful information to other administrators of target systems 112 considering various upgrade options by providing actual data indicating how upgrades and changes in configuration of other separate systems 114 have affected performance in separate systems 114.

Figure 4:
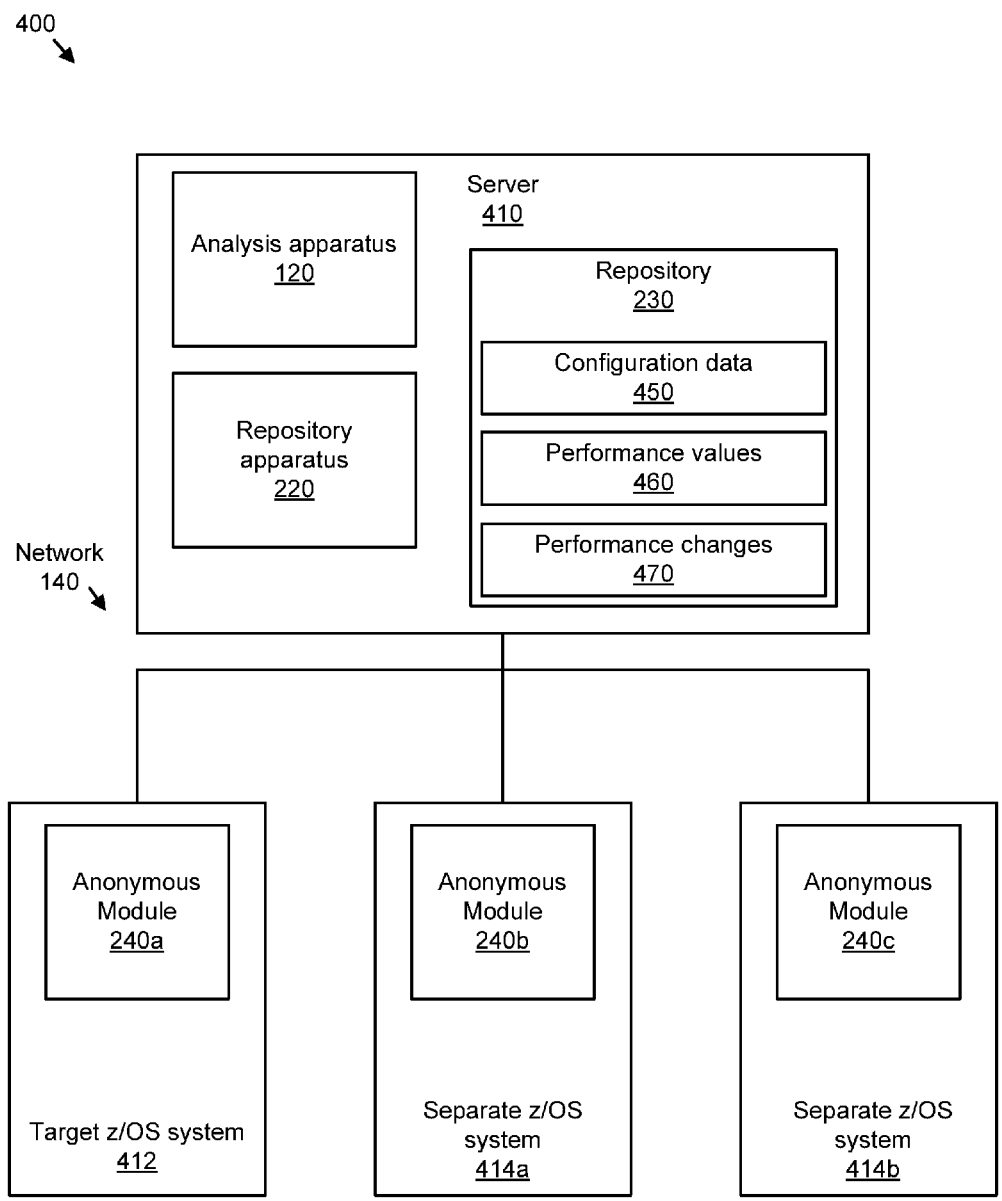
FIG. 4 is an illustrative block diagram showing one implementation with a server gathering configuration data and performance values from multiple z/OS systems.

FIG. 4 shows one example of a system 400 comprising a server 410 communicatively connected to a plurality of z/OS systems operating on mainframe computers. An administrator of the target z/OS system 412 may want to determine how the target z/OS system 412 is performing relative to other comparable z/OS systems in use. FIG. 4 is one example of how the invention may be used; the present invention is not necessarily limited to z/OS or mainframe systems.

The server 410 may connect to a plurality of z/OS systems, including the target z/OS system 412 and separate z/OS systems 414a-b. The repository apparatus 220 may maintain a repository 230 that includes configuration data 450, performance values 460, and performance changes 470 for the separate z/OS systems 414a-b and the target z/OS system 412. The anonymous modules 240a-c may transmit the configuration data 450 and the performance values 460 to the server 410 and may remove client-identifying prior to doing so.

The analysis apparatus 120 may compare the target configuration of the target z/OS system 412 with one or more of the reference configurations of the separate z/OS systems 414a-b. Examples of configuration data 450 that may provide the basis for this comparison were given above. Other varieties of configuration data 450, in addition to that given in the non-exclusive list above, may also be used.

The analysis apparatus 120 may compare the target configuration and the reference configurations to determine a level of similarity. In one embodiment, the analysis apparatus 120 does so by comparing the target configuration against all other reference configurations represented by the configuration data 450 in the repository 230. The analysis module 120 may compare each aspect of the target configuration (such as the number of LPARs) with each aspect of the reference configurations and assign a weight between 0 and 1 representing how closely the configurations match. A 0 may indicate that none of the hardware or software match, while a 1 may indicate a perfect match of the configuration data 450 that constitutes the target configuration and the configuration data 450 that constitutes the reference configuration. For example, the weight for the separate z/OS system 414a may be 0.92. The analysis apparatus 120 may then create a match percentage that represents a percentage match between the target configuration and the reference configuration for each separate z/OS system 414a-b. To continue the example above, the match percentage for the separate z/OS system 414a may be 92%.

The analysis apparatus 120 may then, for each separate z/OS system 414a-b, create a comparison threshold by subtracting the match percentage from one-hundred. For separate z/OS system 414a, the comparison threshold would be 100−92=8. This process may be repeated for each separate z/OS system 414a-b to be used for comparison.

The analysis apparatus 120 may then move to determining differences between target performance values and reference performance values. The performance values 460 may be RMF data. The analysis apparatus 120 may consider each type of performance value 460 for which the repository 230 has data (such as lock rate, CPU usage over time, etc), or may focus on certain types of performance values 460 and exclude others. In certain embodiments, the administrator of the target z/OS system 412 can indicate which types of performance values 460 to compare.

Figure 3B:
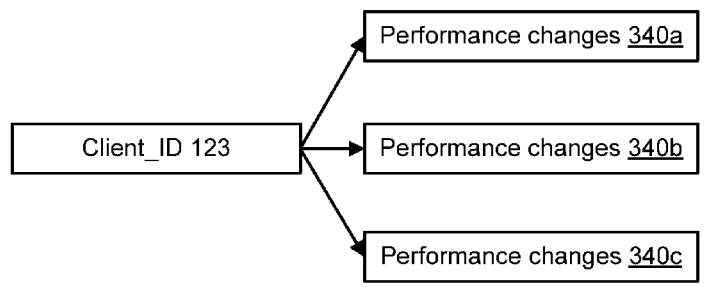

In one embodiment, the analysis apparatus 120 generates an average value for each type of reference performance value 460 to be compared; referring to FIG. 3, there may be multiple entries of reference performance values 320a-c. The analysis apparatus 120 may generate average values for the reference performance values 320a-c rather than compare the target performance values against each entry of performance values 320a-c. Similarly, the target z/OS system 412 may have multiple target performance values 460 stored in the repository. The analysis apparatus 120 may generate averages for each type of target performance value 460 to form the basis of comparison.

The analysis apparatus 120 may determine, for each data value of the target performance values of the target z/OS system 412, a performance percentage difference that represents the difference between the target performance values and the corresponding reference performance value of the separate z/OS system 414a expressed as a percentage. For example, the target z/OS system 412 may have 1200 locks per second, while the separate z/OS system 414a may have 1400 locks per second. The analysis apparatus 120 may determine that the performance percentage difference is 1200/1400=85.7%. The analysis apparatus 120 may further generate a performance threshold by subtracting the performance percentage difference from one-hundred and taking the absolute value; in the example above, the performance threshold would be |100−85.7|=14.3%.

The analysis apparatus 120 may the compare the performance threshold and the comparison threshold for each data value of the target performance values 460 being analyzed. For each data value of the target performance values 460 for which the performance threshold is larger than the comparison threshold, the analysis apparatus 120 may report that data value to the administrator of the target z/OS system 412. For example, since the performance threshold in the locks example above is 14.3, and the comparison threshold is 8, the analysis apparatus 120 would report the information on the locking to alert the administrator of the target z/OS system 412.

In certain embodiments, the data value for the for the performance values 460 of the target z/OS system 412 may be larger than those for the reference performance values 460. For example, the locks per second for the target z/OS system 412 may be 1800 and the locks per second for the separate z/OS system 414a may be 1400. The analysis apparatus 120 may determine that the performance percentage difference is 1800/1400=128%. The analysis apparatus 120 may take the absolute value of the performance percentage difference and one-hundred to arrive at a performance threshold of 100−128=28.6. As above, the performance threshold is compared against the comparison threshold, and data values of the performance values 460 for which the performance threshold is greater than the comparison threshold are reported.

The above is simply one example of how an analysis apparatus 120 may determine levels of similarity between a target system 112 and separate systems 114, determine differences between target performance values and reference performance values, and to generate reports if the target performance values are outside an acceptable range after accounting for the level of similarity. Other approaches that differ from the above may also be used.

As described above, the repository apparatus 220 may also maintain performance changes 470 data that provides information about how changes in configuration of a system, represented by configuration data 450, affect performance. In one embodiment, the repository apparatus 220 creates a new entry into the configuration data 450 when a client changes its configuration. The repository apparatus 220 may create the new entry anytime a client changes configuration; in other embodiments, the repository apparatus 220 creates the new entry only in response to a significant change in the configuration. What is or is not a significant change may be defined by an administrator.

The repository apparatus 220 may consolidate the entries in the performance values 460 that are associated with the previous configuration of the client. For example, the repository apparatus 220 may average all entries in the performance values 460 associated with the old configuration data 450 of the client and store the averages. The repository apparatus 220 may then begin receiving new performance values 460 created after the change in the configuration data 450 for the same client, which new performance values 460 are associated with the updated configuration data 450.

The repository apparatus 220 may compare the average performance values 460 associated with the previous configuration with the average performance values 460 associated with the updated configuration and store the results of the comparison as performance changes 470 in the repository 230. In one embodiment, the repository apparatus 220 may store performance changes 470 that is a percentage representing a percentage change in performance values 460 following a change in the configuration for the client. For example, the repository apparatus 220 may store performance changes 470 indicating that a change in the configuration for the client resulted in a 6% decrease in locks. The repository apparatus 220 may store similar values for the relevant performance values 460 being accounted for in the system 400.

The analysis apparatus 120 may use the performance changes 470 to provide guidance concerning upgrade paths to an administrator of the target z/OS system 412. An administrator of the target z/OS system 412 may request information about the possible impact of a change in configuration to the target z/OS system 412. The analysis apparatus 120 may compare the configuration of the target z/OS system 412 with the configurations of the separate z/OS systems 414a-b using the configuration data 450. The analysis apparatus 120 may assign weightings representing the level of similarity between the configurations of the target z/OS system 412 and the configurations of the separate z/OS systems 414a-b. For those separate systems z/OS systems 414a-b that are sufficiently similar, the analysis apparatus 120 may examine performance changes 470. In one embodiment, a separate z/OS system 414a-b is considered sufficiently similar if it is within a two standard deviation.

For the sufficiently similar separate z/OS systems 414a-b, the analysis apparatus 120 may determine whether a change in configuration has been implemented on that separate z/OS system 414a-b. For such separate z/OS systems 414, the analysis apparatus 120 may determine what change in configuration was made, and how the change impacted performance values 460 for the separate z/OS system 414. The analysis apparatus 120 may further adjust the performance changes 470 to account for the level of similarity; for example, the analysis apparatus 120 may multiply the average improvements represented by the performance changes 470 with the weighting and report the results as an expected performance change if a similar change in configuration were implemented on the target z/OS system 412.

In this manner, the administrator of the target z/OS system 412 may determine possible effects of a change in the configuration of the target z/OS system 412 based on actual data prior to implementing changes in the configuration. This information may provide the administrator with useful options when considering settings, hardware, and possible upgrades to the target z/OS system 412.

Figure 5:
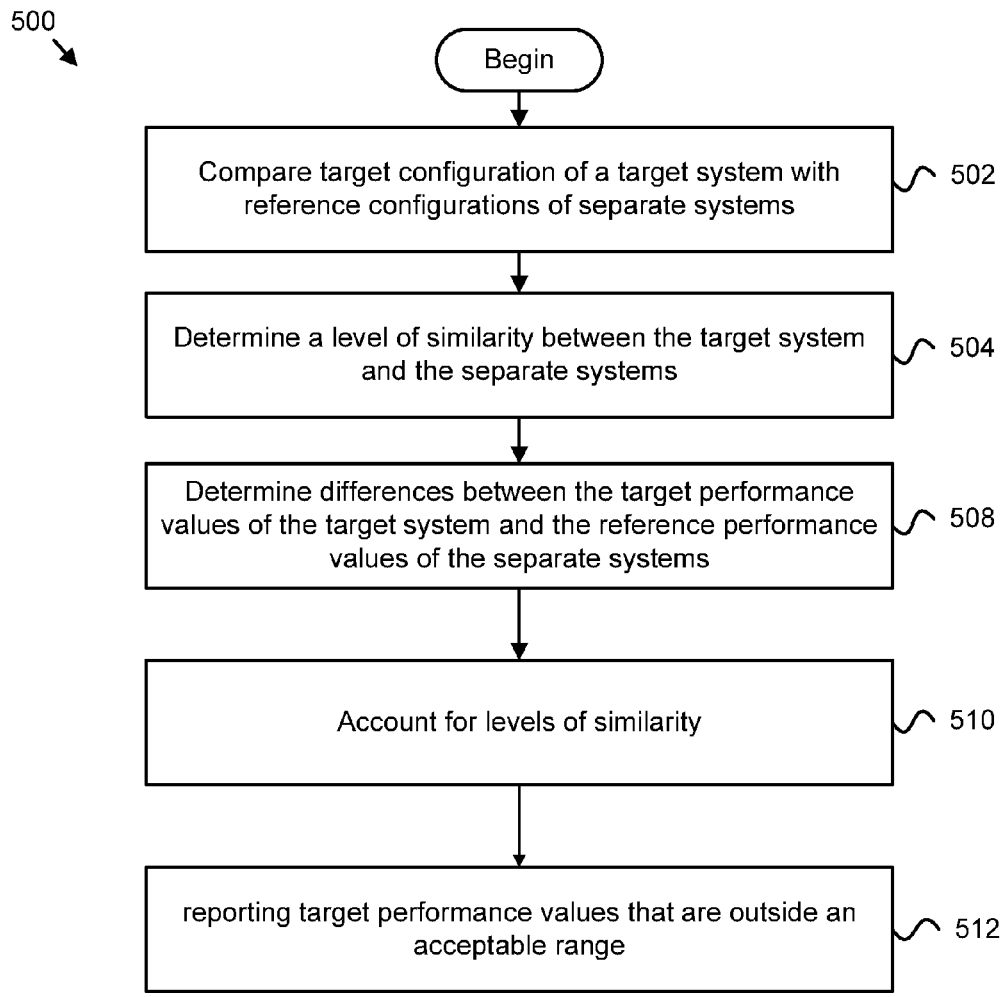
FIG. 5 is an illustrative flow chart diagram illustrating one embodiment of a method for analyzing performance based on anonymous aggregated data.

FIG. 5 shows one embodiment of a method 500 for analyzing a target system. The method 500 may begin with comparing 502 the target configuration of the target system with reference configurations of separate systems. The method 500 may also involve determining 504 the level of similarity between the target system and the separate systems based on the comparison between the target configuration and the reference configurations.

The method 500 may include determining 508 the differences between the target performance values for the target system and the reference performance values for the separate systems, and accounting 510 for the levels of similarity between the target system and the separate system. This may be done for each of the separate systems. In other embodiments, the determination is made only for those separate systems that are deemed sufficiently similar to the target system.

The method 500 may further involve reporting 512 target performance values that are outside an acceptable range. In one embodiment, this involves generating a report. The report may include those target performance values that are outside the acceptable range, and the differences in configuration between the target system and the separate systems having performance values within the acceptable range. Other information that may be useful to the administrator may also be included within the report.

The method 500 may include other steps in addition to, or instead of, those shown in FIG. 5. For example, the method 500 may also involve removing client-identifying information from the target configuration data and from the target performance values, and removing client-identifying information from the reference configuration and the reference performance values. Accounting for the level of similarity may involve assigning a weighting to one or more of the separate systems, where the weighting represents the level of similarity between the target system and the separate system. Other variations on the method 500 may also be implemented, and may fall within the scope of the invention.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored on a non-transitory computer-readable storage medium, the computer program product comprising instructions for:
   determining a level of similarity between a target system and a plurality of separate systems;
   determining differences between target performance values of the target system and reference performance values of one or more of the plurality of separate systems;
   accounting for the level of similarity; and
   reporting one or more of the target performance values being outside an acceptable range, accounting for the level of similarity.

2. The computer program product of claim 1, wherein determining the level of similarity between the target system and the plurality of separate systems comprises comparing a target configuration of the target system with reference configurations of the plurality of separate systems.

3. The computer program product of claim 1, wherein determining differences between the target performance values and the reference performance values comprises comparing target performance values with reference performance values.

4. The computer program product of claim 1, wherein accounting for the level of similarity comprises assigning a weighting to each of the separate systems, wherein the weighting represents the level of similarity between the target system and the separate system.

5. The computer program product of claim 1, further comprising instructions for maintaining a repository of reference performance values and reference configurations of the plurality of separate systems.

6. The computer program product of claim 5, wherein maintaining the repository of reference performance values comprises:
   gathering reference configurations for the separate systems; and
   removing client-identifying information from the reference configurations.

7. The computer program product of claim 6, wherein maintaining the repository of reference performance values comprises:
  gathering reference performance values from the separate systems;
  removing client-identifying information from the reference performance values; and
  associating the reference performance values for the separate systems with corresponding reference configurations.

8. The computer program product of claim 6, further comprising:
  in response to a change in one reference configuration for a separate system, gathering an updated reference configuration for the separate system;
  removing client-identifying information from the updated reference configuration;
  associating the updated reference configuration and the one reference configuration; and
  determining differences between reference performance values for the one reference configuration and reference performance values for the updated reference configuration.

9. The computer program product of claim 8, further comprising generating an upgrade report comprising the differences between the reference performance values for the one reference configuration and the updated reference configuration and sending the upgrade report to an administrator of the target system having a target configuration similar to the one reference configuration.

10. A system comprising:
  a server communicatively connected to a target system and to a plurality of separate systems by a network;
  a repository apparatus that maintains a repository of reference configurations of the plurality of separate systems and reference performance values of the plurality of separate systems, wherein the repository apparatus associates the reference performance values with the corresponding reference configuration of the separate system that generated the reference performance values;
  an analysis apparatus that:
    determines a level of similarity between a target system and one or more of the plurality of separate systems using a target configuration and the reference configurations;
    determines differences between the target performance values of the target system and the reference performances values;
    accounts for a level of similarity; and
    generates a report in response to one or more of the differences,
  accounting for the level of similarity, being outside an acceptable range.

11. The system of claim 10, wherein each of the plurality of separate systems comprises an anonymous module that removes client-identifying information from reference configuration and reference performance values prior to transmitting the reference configuration and the reference performance values to the server over the network.

12. The system of claim 10, wherein the server implements an encrypted cloud.

13. The system of claim 10, wherein the target system is a mainframe computing system, and wherein the plurality of separate systems are mainframe computing systems.

14. The system of claim 10, wherein the repository apparatus further:
  in response to a change in one reference configuration for a separate system, stores an updated reference configuration for the separate system;
  associates the updated reference configuration and the one reference configuration; and
  determines changes in the reference performance values for the one reference configuration and the updated reference configuration.

15. The system of claim 10, wherein the analysis apparatus further predicts a change in performance for the target system in response to a proposed change in configuration for the target system based at least in part on the changes in the reference performance values for the one reference configuration and the updated reference configuration.

16. A computer-implemented method comprising:
  comparing a target configuration of a target system with reference configurations of a plurality of separate systems to determine a level of similarity between the target system and the separate systems;
  determining differences between the target performance values of the target system and the reference performance values of one or more of the plurality of separate systems;
  accounting for the level of similarity; and
  generating a report comprising one or more of the differences being outside an acceptable range, accounting for the level of similarity.

17. The method of claim 16, further comprising removing client-identifying information from target configuration data and from target performance values.

18. The method of claim 16, wherein accounting for the level of similarity comprises assigning a weighting to one or more of the separate systems, wherein the weighting represents the level of similarity between the target system and the separate system.

19. The method of claim 16, wherein generating the report further comprises generating one or more recommended target configurations to address the one or more differences outside the acceptable range.

20. A non-transitory computer program product stored on a computer-readable storage medium, the computer program product comprising instructions for:
  comparing a target configuration of a target system with a reference configuration of a separate system;
  creating a match percentage that represents a percentage match between the target configuration and the reference configuration;
  creating a comparison threshold by subtracting the match percentage from one-hundred;
  for each data value of target performance values of the target system, determining a performance percentage difference that is a difference between the target performance value and a corresponding reference performance value of the separate system expressed as a percentage;
  creating a performance threshold for each data value of the target performance values by subtracting the performance percentage difference from one-hundred;
  for each data value of the target performance values being analyzed, comparing the comparison threshold and the performance threshold; and
  reporting each data value of the target performance values for which the performance threshold is greater than the comparison threshold.

* * * * *